(12) United States Patent
Miglianico

(10) Patent No.: US 11,794,609 B2
(45) Date of Patent: Oct. 24, 2023

(54) PASSENGER-RECEIVING DEVICE AND RELATED PUBLIC TRANSPORTATION VEHICLE

(71) Applicant: ALSTOM Transport Technologies, Saintouen-Sur-Seine (FR)

(72) Inventor: Denis Miglianico, Tassin (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 687 days.

(21) Appl. No.: 16/920,612

(22) Filed: Jul. 3, 2020

(65) Prior Publication Data
US 2021/0009008 A1    Jan. 14, 2021

(30) Foreign Application Priority Data
Jul. 8, 2019   (FR) ...................................... 19 07627

(51) Int. Cl.
| | |
|---|---|
| *B60N 2/02* | (2006.01) |
| *B60Q 3/233* | (2017.01) |
| *B60N 2/90* | (2018.01) |
| *B60J 5/04* | (2006.01) |
| *B60N 2/64* | (2006.01) |
| *G01G 19/08* | (2006.01) |

(Continued)

(52) U.S. Cl.
CPC ...... *B60N 2/02* (2013.01); *B60J 5/04* (2013.01); *B60N 2/64* (2013.01); *B60N 2/90* (2018.02); *B60Q 3/233* (2017.02); *G01G 19/08* (2013.01); *G06V 20/593* (2022.01); *G06V 40/10* (2022.01); *B60N 2002/981* (2018.02)

(58) Field of Classification Search
CPC ........ B60N 2/30; B60N 2/3038; B60N 2/304; B60N 2/3045; B60N 2/3047; B60N 2/305

USPC ....................................................... 296/65.05
See application file for complete search history.

(56) References Cited

U.S. PATENT DOCUMENTS

| | | | |
|---|---|---|---|
| 6,775,606 B1 | 8/2004 | Ertl et al. | |
| 10,059,228 B1 * | 8/2018 | Aikin ................. | B60N 2/42727 |

(Continued)

FOREIGN PATENT DOCUMENTS

| | | |
|---|---|---|
| CN | 101293529 A | 10/2008 |
| CN | 201183490 Y | 1/2009 |
| CN | 102602412 A | 7/2012 |

(Continued)

OTHER PUBLICATIONS

Machine translation CN-112824205-A (Year: 2021).*
Machine translation CN-110356296-A (Year: 2019).*

*Primary Examiner* — Hilary L Gutman
(74) *Attorney, Agent, or Firm* — Knobbe, Martens, Olson & Bear, LLP

(57) ABSTRACT

A passenger-receiving device intended to be installed in a compartment of a vehicle includes a seat bottom movable between a first position in which the seat bottom is configured to allow a passenger to sit on the seat bottom and a second position in which the seat bottom prevents a passenger from sitting on the seat bottom. The device detects the presence of the seat bottom in the first position. The device also includes a signaling module configured to receive a value of a parameter of the compartment and to generate a signal intended for at least one passenger present in the compartment when the measured value is greater than or equal to a predetermined threshold and the seat bottom is in the first position.

8 Claims, 2 Drawing Sheets

(51) Int. Cl.
*G06V 20/59* (2022.01)
*G06V 40/10* (2022.01)

(56) References Cited

U.S. PATENT DOCUMENTS

2020/0093662 A1* 3/2020 Mori .................... B60N 2/3047
2022/0396185 A1* 12/2022 Konieczka ............. B60N 2/242

FOREIGN PATENT DOCUMENTS

| | | | | |
|---|---|---|---|---|
| CN | 107914606 A | * | 4/2018 | |
| CN | 207397327 U | * | 5/2018 | |
| CN | 110356296 A | * | 10/2019 | |
| CN | 112744138 A | * | 5/2021 | |
| CN | 112824205 A | * | 5/2021 | ......... B61D 33/0078 |
| CN | 113602159 A | * | 11/2021 | |
| DE | 102009046628 A1 | | 5/2011 | |
| EP | 2865563 A1 | * | 4/2015 | |
| WO | 02/46003 A1 | | 6/2002 | |

* cited by examiner

PASSENGER-RECEIVING DEVICE AND RELATED PUBLIC TRANSPORTATION VEHICLE

FIELD OF THE INVENTION

The present invention relates to a public transportation vehicle comprising a passenger transport compartment.

BACKGROUND OF THE INVENTION

Public transportation vehicles such as buses, trams or trains generally comprise passenger transport compartments intended to receive passengers during their transport.

These compartments frequently comprise seats of various types, and in particular seats with movable or liftable seat bottoms, often called "jump seats". These seats allow passengers to sit, but their seat bottom can also be raised in case of heavy passenger traffic. Indeed, a person seated on such a jump seat takes up more space than if he was standing, such that when the seat bottom is raised, the footprint of the passenger is reduced and the compartment can accommodate more standing passengers than if the seat bottom was lowered.

However, passengers sometimes remain seated on the movable seats even if the number of passengers present in the compartment is high. These passengers then cause discomfort to the standing passengers in the compartment, since the available space for the latter is monopolized by the seated person and his seat, and in case of heavy passenger traffic, the presence of the seat bottom and the knees of the seated person is a bother for the people standing in the vicinity. Furthermore, the number of people that the vehicle can accommodate is reduced accordingly.

SUMMARY OF THE INVENTION

There is therefore a need for a public transportation vehicle comprising a passenger transport compartment having a seat with a movable seat bottom, this vehicle having an increased transport capacity relative to the vehicles of the state of the art.

To that end, proposed is a passenger-receiving device for a public transportation vehicle, designed to be installed in a compartment of said vehicle, the receiving device comprising:

a seat bottom movable between a first position in which the seat bottom is configured to allow a passenger to sit on the seat bottom and a second position preventing a passenger from sitting on the seat bottom, and detection means able to detect a presence of the seat bottom in the first position, the receiving device further comprising a signaling module able to receive a value of a parameter of the compartment of the vehicle, the parameter depending on a density of passengers present in the compartment, and in that the signaling module is configured to generate a signal intended for at least one passenger present in the compartment when the value is greater than or equal to a predetermined threshold and the seat bottom is in the first position.

Owing to the invention, a person sitting on the seat bottom of the seat is encouraged to stand up when the passenger density in the passenger compartment is greater than or equal to a predetermined threshold. Thus, the vehicle is able to transport a larger number of passengers, under improved comfort conditions, than in the public transportation vehicles of the state of the art.

According to specific embodiments, the device comprises one or more of the following features, considered alone or according to any technically possible combination(s):

the device includes a detector configured to measure the value of the parameter of the compartment, the parameter being a weight supported by a floor of the compartment or a number of passengers present in the compartment.

the detector comprises a computing module and an imager able to acquire an image of the compartment, the computing module being configured to compute the number of passengers present in the compartment from at least the acquired image.

the signal is a signal intended for a passenger seated on the seat bottom.

the signaling module comprises an actuator able to vibrate the seat bottom, the signal comprising a vibration of the seat bottom.

the signaling module comprises at least one light emitter able to emit a light signal.

the seat bottom has a first perimeter, the signaling module comprising a plurality of light emitters arranged on the first perimeter.

the receiving device comprises a backrest, the backrest having a second perimeter, the signaling module comprising a plurality of light emitters arranged on the second perimeter.

Also proposed is a public transportation vehicle comprising at least one passenger transport compartment, the compartment comprising a support and at least one passenger-receiving device comprising a seat bottom supported by the support, characterized in that the receiving device is according to any one of the preceding claims.

According to one embodiment, the compartment comprises a door allowing the passengers to enter the compartment from outside the vehicle.

BRIEF DESCRIPTION OF THE DRAWINGS

Features and advantages of the invention will appear more clearly upon reading the following description, provided solely as a non-limiting example, and done in reference to the appended drawing, in which.

DETAILED DESCRIPTION OF PREFERRED EMBODIMENTS

Figure 1:
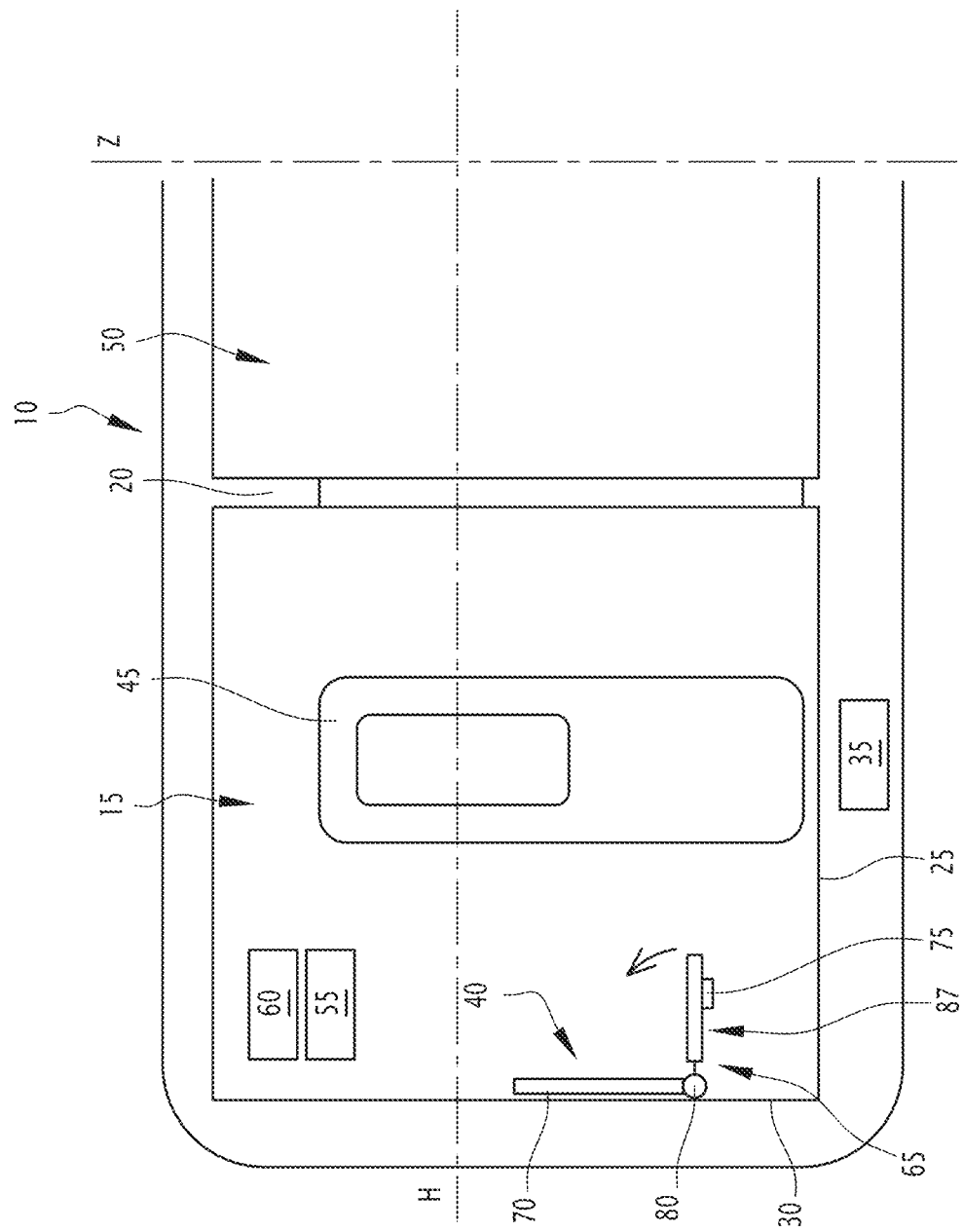
FIG. 1 is a partial sectional schematic illustration of a public transportation vehicle according to the invention, comprising a seat.

A first exemplary public transportation vehicle 10 according to the invention is partially shown in FIG. 1. The vehicle 10 is for example a bus, a train, a railway vehicle car such as a wagon or a tram or a portion of a tram, or an airplane.

The vehicle 10 includes at least one passenger transportation compartment 15.

Each compartment 15 is configured to receive passengers during the movement of the vehicle 10.

The compartment 15 comprises a set of walls 20, a floor 25, a support 30, at least one detector 35 and a passenger-receiving device 40.

In the remainder of this disclosure, the receiving device 40 is called "seat".

The compartment 15 for example comprises at least one door 45 allowing the passengers to enter the compartment 15 from outside the vehicle 10. For example, the compartment 15 is a platform designed to allow the passengers to enter another compartment 50, through the compartment 15, from outside the vehicle 10.

The walls 20 delimit the compartment 15 in a horizontal plane. For example, the walls 20 separate the compartment 15 from the compartment 50 and from the outside of the vehicle 10. Thus, the door 45 and, optionally, one or several doors allowing the communication between the compartments 15 and 50 are each arranged in a wall 20.

The floor 25 delimits the compartment 15 in a vertical direction Z. The floor 25 is configured to bear the weight of the passengers present in the compartment 15.

The support 30 is configured to support the seat 40 at least partially. For example, the support 30 is one of the walls 20, or a post or a set of feet fixing at least part of the seat 40 to the floor 25.

Each detector 35 is configured to measure values of a parameter of the compartment 15.

The parameter depends on a density of passengers present in the compartment 15. In particular, the parameter increases with the density of passengers present in the compartment 15.

"Density of passengers" in particular refers to a number of passengers per surface unit of the floor 25. In particular, the density of passengers is the result of dividing the number of passengers present in the compartment 15 by the total area of the floor 25.

In a variant, the density of passengers is a local density of passengers in an area of the compartment 15 comprising the seat 40.

Each detector 35 is further configured to generate a first signal when the measured value is greater than or equal to a predetermined threshold. The threshold in particular corresponds to the presence of a density of passengers greater than or equal to 4 passengers per square meter.

For example, the detector 35 is configured to measure values of the parameter with a predetermined time period, this time period in particular being between 0.5 seconds (s) and 2 s.

The parameter is, for example, a weight supported by the floor 25. Indeed, the weight supported by the floor 25 is a function of the number of passengers present in the compartment 15. In this case, the threshold is then equal to the product of a reference weight, expressed in kilograms, and the area of the floor 25, expressed in square meters.

The reference weight is, for example, between 130 kg and 160 kg. This corresponds, depending on the countries, to about two passengers on average. The predetermined threshold then corresponds to about two passengers per square meter of the floor 25.

In a variant, the reference weight is between 260 kg and 320 kg, corresponding to about 4 passengers.

In this case, the detector 35 is for example configured to determine a movement of the floor 25, in the vertical direction Z, relative to a reference position in which no passenger is present in the compartment 15.

In a variant, the parameter is a number of passengers present in the compartment 15, or in a zone including the seat 40 of the compartment 15. The predetermined threshold is then for example greater than or equal to two times the area of the floor 25, expressed in square meters, in particular equal to four times the area of the floor 25, expressed in square meters.

In this case, the detector 35 for example comprises an imager 55 and a computing module 60.

The imager 55 is configured to acquire images of the compartment 15 and to send the images to the computing module. The imager 55 is, for example, fixed to a ceiling of the compartment 15.

The computing module 60 is configured to determine the number of passengers present in the compartment 15, or in said zone, from one or several images acquired by the imager 55. In particular, the computing module 60 is configured to identify passengers in the images by image recognition.

For example, the computing module 60 is an electronic module comprising a memory and a processor, the memory comprising software instructions that, when executed by the processor, carry out a method for identifying one or several passengers in the received images.

The seat 40 comprises a seat bottom 65, a backrest 70, detection means and a signaling module 75.

The seat bottom 65 is supported by the support 30. For example, the seat bottom 65 is mounted on a hinge 80 fixed to the support 30. The hinge 80 is in particular configured to allow the seat bottom 65 to rotate about a horizontal axis.

The seat bottom 65 is movable relative to the support 30 between a first position and a second position. In particular, the seat bottom 65 is rotatable about the hinge 80 between the first position and the second position. This is shown by an arrow in FIG. 1.

When the seat bottom 65 is in the first position, shown in FIG. 1, the seat bottom 65 is configured to allow a passenger to sit on the seat bottom 65. For example, the seat bottom 65 is substantially horizontal when the seat bottom 65 is in the first position.

When the seat bottom 65 is in the second position, the seat bottom 65 is configured to prevent a passenger from sitting on the seat bottom 65. For example, the seat bottom 65 is substantially vertical when the seat bottom 65 is in the first position.

In particular, the hinge 80 is, in a known manner, configured to exert a force on the seat bottom tending to move the seat bottom from its first position toward its second position when no passenger is exerting a force on the seat bottom 65.

The seat bottom 65 has a seat bottom face 85, a lower face 87 and a first peripheral face 90.

The seat bottom face 85 is provided so that a passenger sits on the seat bottom face 85 when the seat bottom 65 is in the first position. Thus, the seat bottom face 85 is oriented upward, for example while being substantially horizontal, in particular horizontal to within 10 degrees, when the seat bottom 65 is in the first position.

The lower face 87 is opposite the seat bottom face 85. In particular, when the seat bottom 65 is in the first position, the lower face 87 and the seat bottom face 85 delimit the seat bottom 65 in the vertical direction Z. In this first position, the lower face 87 is oriented downward.

The first peripheral face 90 extends between the seat bottom face 85 and the lower face 87. In particular, when the seat bottom 65 is in the first position, the first peripheral face 90 delimits the seat bottom 65 in a plane perpendicular to the vertical direction Z.

The backrest 70 is for example fixed to a wall 20, or to the hinge 80.

The backrest 70 comprises a front face 95, a rear face 100 and a second peripheral face 105.

The front face 95 is provided so that a passenger seated on the seat bottom face 85 rests his back against the front face 95 when the seat bottom 65 is in the first position. Thus, the front face 95 is oriented toward the inside of the compartment 15, for example while being substantially vertical, in particular horizontal to within 10 degrees, when the seat bottom 65 is in the first position.

The rear face 100 is opposite the front face 95. In particular, the rear face 100 and the front face 95 delimit the backrest 70 along the horizontal direction H perpendicular to the front face 95. The rear face 100 is for example fixed to the support 30.

The second peripheral face 105 extends between the front face 95 and the rear face 100. In particular, the second peripheral face 105 delimits the backrest 70 in a plane perpendicular to the vertical direction Z.

The detection means are configured to detect a presence of the seat bottom 65 in the first position, and to send the signaling module 75 a second signal when the seat bottom 65 is in the first position.

For example, the detection means comprise two electrical contacts placed in contact with one another when the seat bottom 65 is in the first position so as to allow the transmission of a second electrical signal to the signaling module 75. In a variant, the detection means comprise a potentiometer integrated into the hinge 80 and making it possible to measure a rotation of the hinge, or an optical angular sensor.

The signaling module 75 is configured to generate a third signal intended for at least one passenger present in the compartment 15 when the value measured by the detector is greater than the threshold and the seat bottom 65 is in the first position, for example after reception of the first and second signals. In particular, the signaling module 75 is configured to generate the third signal when the first and second signals are received during a same time range having a duration less than or equal to the time period of the detector 35.

The third signal is for example a signal intended for a passenger sitting on the seat bottom 65.

According to one embodiment, the third signal is a vibration of the seat bottom 65 and/or of the backrest 70, in particular a vibration of the seat bottom 65. In this case, the signaling module 75 is for example fixed to the seat bottom 65, for example fixed to the lower face 87 or received in an inner cavity of the seat bottom 65.

In a variant, the signal is a sound signal, or a light signal.

The signaling module 75 for example comprises a control module and an actuator.

The control module is configured to receive the first and second signals and to control the activation of the actuator when the value measured by the detector is above the threshold and the seat bottom 65 is in the first position, for example after the reception of the first and second signals.

The actuator is configured to vibrate the seat 40, in particular the seat bottom 65 when the actuator is activated.

For example, the actuator comprises an electric motor and a mass that the motor is able to move, for example to set in rotation about an axis whereof the center of the gravity of the mass is distant, in order to generate a periodic force on the seat bottom 65. It should be noted that many types of actuators, called vibrators, can be used.

Thus, when the actuator is activated, the seat bottom 65 vibrates around the first position.

In particular, the actuator is configured to vibrate the seat bottom 65 along the vertical direction, that is to say, to generate a periodic movement of the seat bottom 65 between two extreme positions that are vertically separated from one another.

The actuator is for example configured to impose a vibration frequency of the seat bottom 65 of between 0.1 hertz and 0.5 hertz, for example equal to 0.2 hertz.

Figure 2:
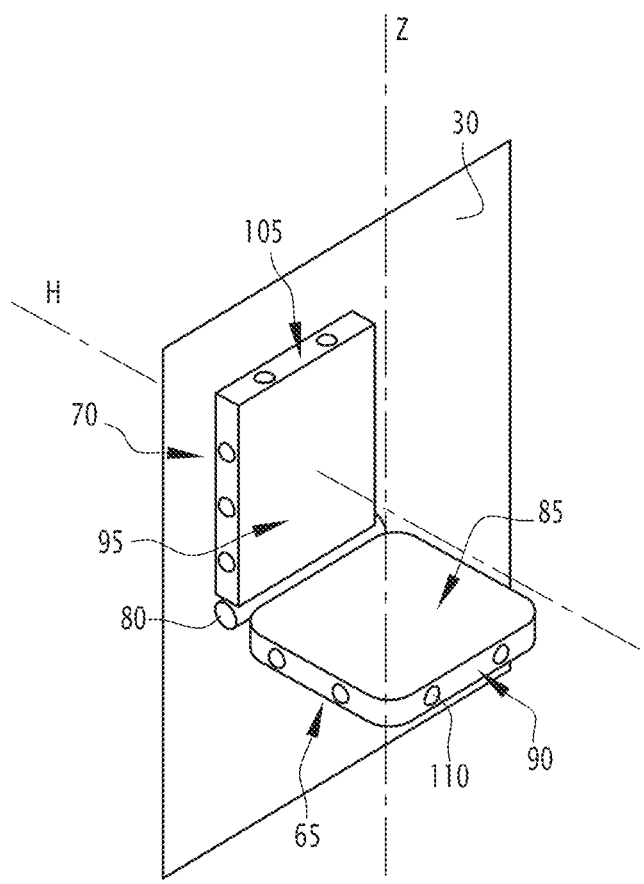
FIG. 2 is a perspective view of the seat of FIG. 1.

A seat 40 of a second exemplary vehicle 10 is shown in perspective view in FIG. 2. In the description that follows of the second example, the elements that are identical to the first example are not described again. Only the differences are shown.

The third signal is a signal intended for a passenger at a distance from the seat 40, that is to say, a passenger who is not seated on the seat bottom 65.

The third signal is for example a light signal. In a variant, the signal is a sound signal.

For example, the signaling module 75 comprises, in place of the actuator, at least one light emitter 110, for example a plurality of light emitters 110.

The control module is configured to control the illumination of each light emitter 110 when the value measured by the detector is above the threshold and the seat bottom 65 is in the first position, for example after the reception of the first and second signals.

Each light emitter 110 is for example a light-emitting diode, or an incandescent bulb.

Each light emitter 110 is configured to emit the third signal intended for a passenger of the compartment 15 who is not seated on the seat 40 when it is illuminated. In particular, each light emitter 110 is provided to be visible by this passenger when the light emitter 110 is illuminated.

For example, each light emitter 110 is arranged on a perimeter of the seat bottom 65 or the backrest 70. For example, each light emitter 110 is arranged on the first peripheral face 90 or on the second peripheral face 105. In particular, as shown in FIG. 2, a plurality of light emitters 110 are arranged on each of the first peripheral face 90 and the second peripheral face 105.

In a variant, at least one light emitter 110 is arranged vertically overhanging the seat 40, and/or configured to illuminate the seat 40 and a passenger seated on the seat 40 with visible light.

The signaling module 75 is, for example, configured to illuminate each light emitter 110 continuously when the third signal is generated.

In a variant, the signaling module 75 is configured to illuminate each light emitter 110 intermittently, in particular periodically, when the third signal is generated. For example, the signaling module 75 is configured to illuminate each light emitter 110 alternately according to a predetermined sequence.

It should be noted that embodiments in which the third signal comprises a component intended for the passenger seated on the seat bottom 65, such as vibrating the seat bottom, and a component intended for other passengers, such as illuminating emitters 110, are also conceivable.

Owing to the invention, the third signal encourages a person seated on the seat bottom 40 to stand when the number of passengers in the compartment 15 is high and it is therefore desirable for him to free this space. This therefore makes it possible to increase the feeling of comfort for the other passengers present in the compartment, in particular for the standing passengers.

When the third signal is a signal intended for the passenger seated on the seat bottom 65, this signal is discreet and does not inconvenience the other passengers.

The vibration of the seat bottom 65 is easily perceived by the passenger seated on the seat bottom 65 even if he is absorbed in an activity or listening to music.

When the third signal is intended for one or several passengers at a distance from the seat 40, they are informed that the person seated on the seat bottom 65 should stand. This can more effectively encourage people to stand who may be less sensitive to a message directed at them, but who are sensitive to social pressure from other passengers.

The illumination of the light emitters has the advantage of not causing discomfort to the person seated on the seat bottom 65, which is in particular preferable when this person is a pregnant woman or an ill or elderly person who is therefore legitimately seated despite the large number of passengers.

The arrangement of the light emitters 110 on the perimeters 90, 105 of the seat bottom 65 and/or the backrest 70 allows the other passengers to clearly see the emitters 110 when they are illuminated.

What is claimed is:

1. A passenger-receiving device for a public transportation vehicle, designed to be installed in a compartment of said vehicle, the receiving device comprising:
    a seat bottom movable between a first position in which the seat bottom is configured to allow a passenger to sit on the seat bottom and a second position preventing a passenger from sitting on the seat bottom,
    a seat position detector configured to detect a presence of the seat bottom in the first position,
    a signal generator configured to receive a value of a parameter of the compartment of the vehicle, the parameter depending on a density of passengers present in the compartment, the signal generator further configured to generate a signal configured to be detectable by at least one passenger present in the compartment when the value is greater than or equal to a predetermined threshold and the seat bottom is in the first position,
    wherein the signal generator comprises at least one light emitter able to emit a light signal,
    wherein the seat bottom has a first perimeter, the signal generator comprising a plurality of light emitters arranged on the first perimeter.

2. The device according to claim 1, wherein the device includes a parameter detector configured to measure the value of the parameter of the compartment, the parameter being a weight supported by a floor of the compartment or a number of passengers present in the compartment.

3. The device according to claim 2, wherein the parameter detector comprises a computer and an imager able to acquire an image of the compartment, the computer being configured to compute the number of passengers present in the compartment from at least the acquired image.

4. The device according to claim 1, wherein the signal is a signal intended for a passenger seated on the seat bottom.

5. The device according to claim 4, wherein the signal generator comprises an actuator able to vibrate the seat bottom, the signal comprising a vibration of the seat bottom.

6. A public transportation vehicle comprising at least one passenger transport compartment, the compartment comprising a support and at least one passenger-receiving device according to claim 1 comprising the seat bottom supported by the support.

7. The public transportation vehicle according to claim 6, wherein the compartment comprises a door allowing passengers to enter the compartment from outside the vehicle.

8. A passenger-receiving device for a public transportation vehicle, designed to be installed in a compartment of said vehicle, the receiving device comprising:
    a seat bottom movable between a first position in which the seat bottom is configured to allow a passenger to sit on the seat bottom and a second position preventing a passenger from sitting on the seat bottom,
    a seat position detector configured to detect a presence of the seat bottom in the first position,
    a signal generator configured to receive a value of a parameter of the compartment of the vehicle, the parameter depending on a density of passengers present in the compartment, the signal generator further configured to generate a signal configured to be detectable by at least one passenger present in the compartment when the value is greater than or equal to a predetermined threshold and the seat bottom is in the first position,
    wherein the signal generator comprises at least one light emitter able to emit a light signal, and
    wherein the passenger-receiving device comprises a backrest, the backrest having a second perimeter, the signal generator comprising a plurality of light emitters arranged on the second perimeter.

* * * * *